United States Patent
Chidambaran et al.

(10) Patent No.: US 6,324,567 B2
(45) Date of Patent: *Nov. 27, 2001

(54) METHOD AND APPARATUS FOR PROVIDING MULTIPLE COMMANDS TO A SERVER

(75) Inventors: Luxi Chidambaran, Fremont; Sahikanth Chandrasekaran, Belmont, both of CA (US)

(73) Assignee: Oracle Corporation, Redwood Shores, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/249,222

(22) Filed: Feb. 11, 1999

Related U.S. Application Data

(63) Continuation-in-part of application No. 08/873,644, filed on Jun. 11, 1997.

(51) Int. Cl.[7] .................................................... G06F 15/16
(52) U.S. Cl. .......................... 709/203; 709/330; 707/102; 707/103; 707/104; 714/52; 714/48; 714/49
(58) Field of Search ................................. 709/203, 219, 709/101, 202, 302, 303, 304, 305, 217, 310, 330, 313, 328; 707/103, 102, 104; 714/34, 758, 52, 49, 48

(56) References Cited

U.S. PATENT DOCUMENTS

| | | | |
|---|---|---|---|
| 5,611,050 | * | 3/1997 | Theimer et al. ..................... 709/202 |
| 5,613,155 | * | 3/1997 | Baldiga et al. ........................... 710/5 |
| 5,675,796 | * | 10/1997 | Hodges et al. ....................... 709/100 |
| 5,712,971 | * | 1/1998 | Stanfill et al. ....................... 714/341 |
| 5,740,362 | * | 4/1998 | Buickel et al. ....................... 707/10 |
| 5,774,668 | * | 6/1998 | Choquier et al. .................... 709/223 |
| 5,802,298 | * | 9/1998 | Imai et al. ........................... 709/217 |
| 5,832,219 | * | 11/1998 | Pettus .................................. 709/203 |
| 5,884,316 | * | 3/1999 | Bernstein et al. ................... 707/103 |
| 5,926,636 | * | 7/1999 | Lam et al. ........................... 709/303 |
| 5,935,211 | * | 8/1999 | Osterman ............................ 709/228 |
| 5,956,509 | * | 9/1999 | Kevner ................................ 709/304 |
| 5,978,577 | * | 11/1999 | Rierden et al. ........................ 707/10 |
| 5,978,813 | * | 11/1999 | Foltz et al. .......................... 707/201 |
| 5,999,938 | * | 12/1999 | Bliss et al. .......................... 707/102 |
| 6,006,230 | * | 12/1999 | Ludwig et al. ........................ 707/10 |
| 6,006,278 | * | 12/1999 | Cottrill ................................ 709/300 |

* cited by examiner

*Primary Examiner*—Robert B. Harrell
*Assistant Examiner*—William C. Vaughn, Jr.
(74) *Attorney, Agent, or Firm*—Innovation Partners; Charles E. Gotlieb

(57) ABSTRACT

A method and apparatus allows a client to easily send multiple commands to a server. The client registers one or more tables with the method and apparatus of the present invention, which contain information with which to query the client if the client provides commands to be sent to a server. When the client sends a command intended for the server, the command and the tables are used to query the client. If the application responds affirmatively to the query, additional commands are generated for sending to the server. The method and apparatus assist in handling errors by deleting, either unconditionally or upon receipt of an instruction from the client, all pending commands related to the command causing the error and not generating additional such commands.

10 Claims, 6 Drawing Sheets

METHOD AND APPARATUS FOR PROVIDING MULTIPLE COMMANDS TO A SERVER

RELATED APPLICATIONS

This application is a Continuation-in-Part of application Ser. No. 08/873,644 entitled, "Method and Apparatus for Reducing Inefficiencies Caused by Sending Multiple Commands to a Server" filed on Jun. 11, 1997 by Debashish Chaterjee and Luxi Chidambaran having the same assignee as this application and is incorporated herein by reference in its entirety.

FIELD OF THE INVENTION

The present invention is related to computer software and more specifically to client-server computer software.

BACKGROUND OF THE INVENTION

Commands sent to a server may be implemented as remote procedure calls. A remote procedure call allows a client to invoke any simple or complex operation on the server by means of a simple procedure call abstraction. An RPC subsystem generates client server stubs to send and receive parameters, freeing the application from this complexity.

Many client-server systems implement each invocation of a command as a separate "round trip" to the server. In such a scenario, each command invocation is delayed due to the network latency, the delay (approximately 4 milliseconds in many networks) that occurs when a client command is sent to the server. In addition, execution of each command requires the server to perform context switches, requiring resources on the server for each such command it receives.

Another problem with single remote procedure calls is that they use system resources extremely inefficiently. Basic system resources include the client, the network and the server. When a client prepares a single RPC, the server and the network connection between the client and server sit idle. When the client sends the RPC over the network, the client and server sit idle. When the server processes the RPC, the client and the network connection between the client and server sit idle. When the response is transmitted to the client over the network, the server and client sit idle. As a result of this inefficiency, the throughput of the system, that is, the number of requests for service processed in a given amount of time, is low.

To amortize the network latency and context switching over several commands, multiple commands may be bundled together. However, this approach does not achieve optimal efficiency of the system. The client still sits idle during transmission of the bundle and its result and during server processing of the bundle. The server and network are still idle while the client assembles the bundle.

Although the efficiency, and therefore, throughput, of a bundled RPC system improves over that of a single-RPC-at-a-time, response time is actually worse, because the first RPC to arrive in the bundle must wait until additional RPCs arrive to produce the bundle. Conventional systems which perform bundling in the client using a process external to the application are especially prone to this problem, because the application had no control over the process. If the client has a high priority RPC, it would be placed by the external process into a queue of the external process waiting for enough RPCs to arrive to produce a bundle before the high-priority RPC would be sent.

It would be possible to allow the client bundling to be performed by the application to give the application more control over the bundling process, allowing high priority commands to be sent right away and low priority commands to be bundled. However, such an approach causes other problems. If the application sends too many small bundles, the overhead associated with calling the RPC system too often will cause its own efficiency problems. If the application sends too few large bundles, the response time problem above is made worse. In addition, the application is made more complex because the application is required to perform its own memory management functions. Another problem with this approach is that it would likely increase the memory requirements in the client because not only would the application require a buffer for storage of the bundle, but when the bundle is provided to a transport process, the transport process will require its own buffer for reliable transmission of the bundle.

Whether the bundling is performed by the application or an external process, the error handling required to recover from errors becomes extremely complex because there may be outstanding RPCs at the time the error occurs and correct handling of any error may depend on which command caused the error.

Therefore, a system and method is desirable that improves the efficiency and throughput of the system by reducing or even eliminating idle time of the client, network connection and server, amortizes network latency, context switching and RPC subsystem overhead without imposing significant delay, does not require the application to perform complex memory management functions nor requires two buffers to queue and reliably send the bundles, and simplifies programming of error handling.

SUMMARY OF INVENTION

A method and apparatus intercepts server commands, such as remote procedure calls, which are generated by an originator such as an application program. The method and apparatus queries the originator of the remote procedure call whether it desires other commands, such as remote procedure calls, to be sent to the server. If the originator assents to the query, it may provide any parameters to use in building the other commands. The original command is tagged with an identifier, and any other commands built are also tagged with the same tag as the original command. The command received and the commands built are provided, for example to a queue to be sent to a server, either as they are built or in small batches, for execution. This arrangement maximizes throughput by bundling related commands in a manner that is easy to program. It also allows related application state to be monitored as and when required. Memory requirements are not significantly increased because only one command is processed at a time. If an error is detected by the application program, it may instruct the method and apparatus to flush from the queue the commands tagged with the same tag as the command that caused the error in order to prevent additional commands from being sent to the server. Additionally, the method and apparatus can instruct the server to abort processing the commands tagged with the same tag as the command that caused the error. Errors detected and reported by the server include the tag or other identifier of the command that caused the error. The server may abort processing of commands having a similar tag, and then flush similarly-tagged commands from the server queue as described above, either automatically, or in response from the application program after a description of the error and the tag are passed to it.

DETAILED DESCRIPTION OF A PREFERRED EMBODIMENT

Figure 1:
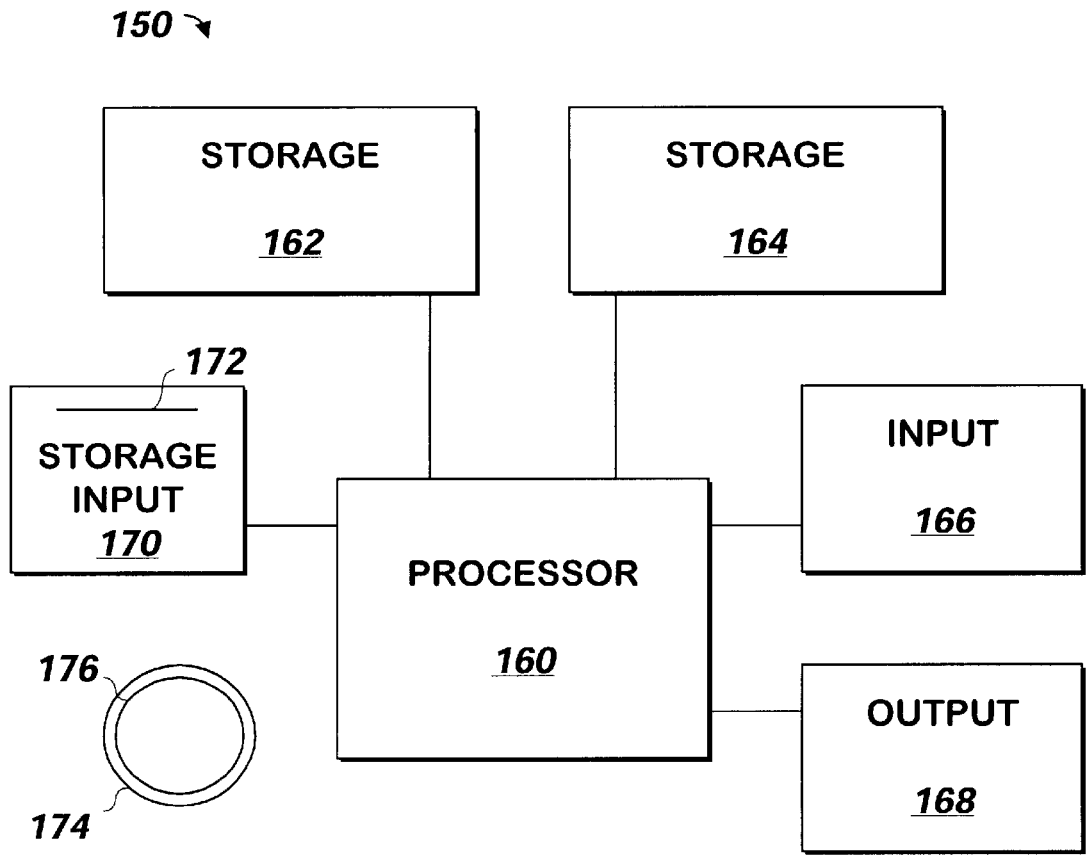
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Mountain View, Calif., although other systems may be used.

Figure 2:
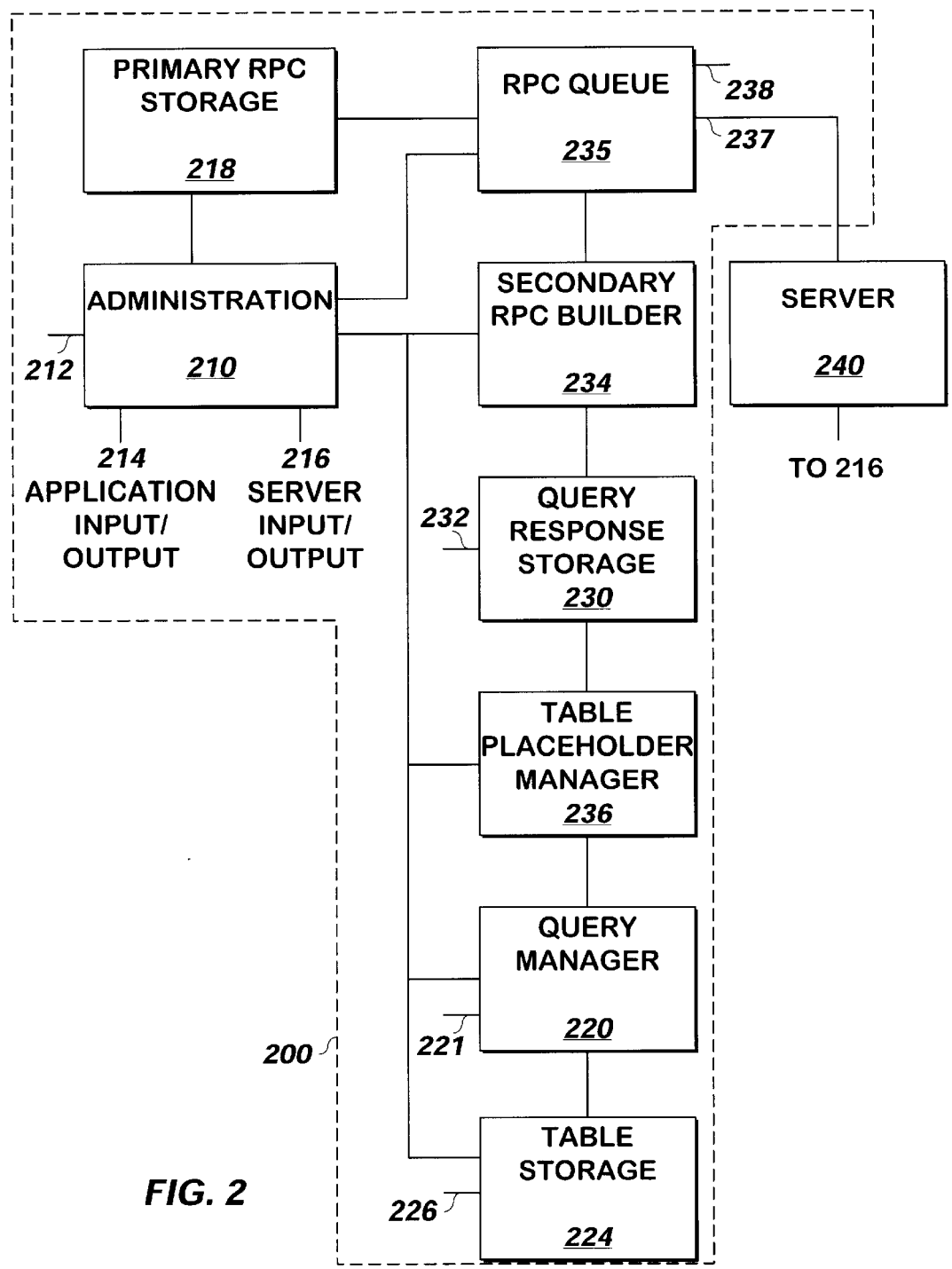
FIG. 2 is a block schematic diagram of an apparatus for providing commands for a server according to one embodiment of the present invention.

Referring now to FIG. 2, an apparatus for providing commands to be sent to a server 240 is shown according to one embodiment of the present invention. In one embodiment, an application program registers with the system 200 one or more tables that instruct the system 200 how to respond to the receipt of remote procedure calls, referred to as "RPCs", intended for the server. Each table contains one or more rows, with each row containing an RPC code and a query. In this manner, tables are registered to the system 200. Such registration may occur before the conventional operation of the application program, and/or during such conventional operation. Tables may thus be registered during the conventional operation of the application program.

As described below, when the system 200 receives an RPC (referred to as the "primary RPC") from an application program, the system 200 uses the tables to query the application program. The application program can indicate an affirmative response to the query and include any parameters associated with the RPC code corresponding in the table to the query. The system then generates an RPC, referred to as a "secondary RPC", using the RPC code and the parameters as described in more detail below.

In one embodiment, each table is received at input 226 with header information that includes one or more RPCs as described below. Table storage 224 receives at input 226 the one or more tables. Input 226 may receive the one or more tables from an application program or other source. Each table is stored in table storage 224 for use as described below.

Administration 210 receives from an application program at input/output 214 a remote procedure code, or RPC. The RPC received from the application program is referred to as the primary RPC. In one embodiment, each RPC is made up of an RPC opcode and any parameters used in executing the RPC at the server 240. Administration 210 generates a tag and associates the tag with the RPC received. The tag is an identifier that identifies the primary RPC and any secondary RPCs generated in response to the receipt of that RPC by the present invention. In one embodiment, the tag is generated by adding '1' to any prior tag generated, or using a value of '0', if no prior tags have been generated by administration 210.

As described below, the present invention generates secondary RPCs for some or all primary RPCs, and each of these secondary RPCs is tagged with the same value as the primary RPC which caused it to be generated. The tag value used by administration 210 should be large enough to allow every group of primary RPCs and corresponding secondary RPCs to be uniquely identified until the entire group of RPCs has been executed by the server 240 and the response has been received by the application program which generated the primary RPC. Administration 210 provides the tag to secondary RPC builder 234, described in more detail below.

In one embodiment, administration 210 stores the primary RPC and the tag into primary RPC storage 218. In such embodiment, the primary RPC is queued for sending to the server only after queuing all secondary RPCs generated as described below. Thus, the primary RPC is stored in primary RPC storage 218 until all secondary RPCs have been generated as described below. In an alternate embodiment of the present invention, the primary RPC is queued ahead of all secondary RPCs generated as described below. In such embodiment, no primary RPC storage 218 is necessary, and administration 210 stores the primary RPC and tag into RPC queue 235 upon receipt at administration input/output 214.

In one embodiment, multiple tables, described below, may be defined to the system 200 and stored in table storage 224. Each table contains in a header one or more RPCs: a particular table is to be used if the primary RPC matches one of the RPCs in the header of the table. Administration 210 compares the primary RPC received at input 214 with the primary RPCs stored in the header of each table stored in table storage 224. If administration 210 identifies a match between the primary RPC received at input/output 214 and one of the RPCs stored in the header of a table stored in table storage 224, administration 210 identifies the table containing such matching RPC, for example by retaining a pointer to such table. Administration 210 passes this pointer to table place holder manager 236.

In one embodiment, if no match is made between the primary RPC and any of the RPCs in the header of each table, a default table is identified by administration 210. In another embodiment, if no match is made, administration 210 passes the tagged primary RPC directly to RPC queue 235 and the operation of the remainder of the system 200 described below is not performed for such primary RPCs, allowing such primary RPCs to avoid generating any secondary RPCs.

In an alternate embodiment of the present invention, all RPCs received at input 214 use a single table. In such embodiment, no such comparison is required, and administration 210 signals table place holder manager 236. Table place holder manager 236 initializes by pointing to the first row in this single table stored in table storage 224.

Table place holder manager 236 maintains a place holder indicating a particular row of the table identified by administration 210. When table place holder manager 236 receives the pointer to the table from administration 210, table place holder manager 236 initializes the place holder it stores to point to the first row in the table corresponding to the pointer received from administration 210.

After signaling table place holder manager 236, administration 210 signals query manager 220. Query manager 220 retrieves the place holder held by table place holder manager 236 and retrieves from table storage 224 the query in the row of the table pointed to by the place holder retrieved from table place holder manager 236. Query manager 220 provides at output 221 coupled to the application which provided the primary RPC the query defined in the row of the table pointed to by table place holder manager 236. In one embodiment, output 221 is coupled to input 214, however such coupling is not shown to avoid cluttering the Figure. In one embodiment, query manager 220 signals table place holder manager 236 at the time it provides the query at output 221 for use as described below.

Query response storage 230 receives the response to the query at input 232 coupled to the application program that received the query. In one embodiment, the response indicates whether a secondary RPC made up of the RPC code corresponding to the query should be built and queued to be sent to the server 240. If the response to the query indicates that such an RPC should be built, the response also indicates any parameters to send to the server 240 with the RPC. If the response indicates that the RPC corresponding to the query should be sent to the server 240, query response storage 230 sends the parameters received to secondary RPC builder 234. Secondary RPC builder 234 retrieves the place holder stored in table place holder manager 236 and builds a secondary RPC containing the secondary RPC code stored in table storage 224 corresponding to the placeholder retrieved, the parameters received by query response storage 230 and the tag received from administration 210 described above. Secondary RPC builder 234 transfers the secondary RPC it builds to the tail of the RPC queue 235. The RPC queue 235 is a conventional RPC queue described above. The contents of RPC queue 235 are transmitted to the server 240 via output 237 when the RPC queue 235 is full, or when a periodic timer signal is received at input 238. The periodic timer signal may be received from an operating system upon instruction from administration 210 via output 212.

Query response storage 230 signals table place holder manager 236 that a response has been received. In one embodiment, table place holder manager 236 sets a timer at the time it was first signaled by query manager 220. If table place holder manager 236 does not receive the signal from query response storage 230 that a response has been received before the timer elapses, table place holder manager 236 signals administration 210 that an error has occurred. If no such error occurred, table place holder manager 236 points to the next row in the table stored in table storage 224 upon receipt of the signal from query response storage 230 that a response to the query has been received. Table place holder manager 236 next signals query manager 220 to repeat the process described above, including sending the query pointed to by table place holder manager 236. In this embodiment, the system 200 queries the application program using each query in the table until no unsent queries remain in the table. When no unsent queries remain in the table, table place holder manager 236 signals administration 210 instead of signaling query manager 220. In such embodiment, if the primary RPC is sent to the server 240 after the secondary RPCs, administration 210 signals primary RPC storage 218 to transfer the primary RPC to the tail of the RPC queue 235.

In one embodiment, some or all of the rows of the table stored in table storage 224 have an optional "repeat" parameter that has meaning only to the system 200 and is not sent to the server 240 with the secondary RPC. If the application program returns with the response to the query a repeat parameter equal to true, query response storage 230 signals table place holder manager 236 that the application desires the system 200 to repeat the prior query. Table place holder manager 236 does not advance the place holder to the next row of the table. Instead, table place holder manager 236 signals query manager 220. As described above, query manager 220 uses the place holder of table placeholder manager 236 to build the query sent to the application program. Because the placeholder is not updated by table placeholder manager 236, the prior query sent to the application program at output 224 by query manager 220 is resent to the application program at output 224. The application program can thereby cause a query to be repeated again and again until the application program sets the repeat parameter to false in the response to the query, or does not return it in the response.

In one embodiment, the repeat parameter can operate as a "goto" command. Instead of signaling table placeholder manager 236 without advancing the placeholder, query manager 220 can adjust the placeholder to point to a specified row of the table received in the response to the query. Another response may signal query manager 220 to adjust the placeholder by an offset amount from the current row pointed to by the placeholder as specified in the response to the query. When table placeholder manager 236 signals query manager, query manager will use the placeholder adjusted as described above.

The use of a repeat parameter can reduce the size of the table stored in table storage 224, reducing memory requirements for table storage 224 and keeping any table within any size limits that may be imposed.

A repeat parameter has many applications. One such application is when requests for work are received and directed to one of multiple servers to which the apparatus 200 is connected. One thread of an application can place a request in the queue, and a second thread can remove the request from a specified queue, build the RPC that will implement the request and send the RPC to the server serving the thread. Each thread can operate independently of the other. The first thread can add to the queue as necessary. When the repeat parameter is true, a query performed by the second thread, in addition to returning parameters for the RPC, can identify whether any additional commands are in the queue. The second thread can thus check the state of the queue it serves as often as RPCs can be built for the commands contained in the queue, but need not check the queue more often.

If an error occurs as a result of the execution by the server 240 of an RPC, it may be detected by the server 240 or the application program. If the server 240 or the application program detects an error, the server 240 or application program is referred to as a detecting unit. The detecting unit reports the error to administration 210. In one embodiment, the server 240 reports errors to administration at input/output 216 and the application program reports errors to administration at input/output 214. The report can include an indicator of the type of error, such as divided by zero error, and includes the tag of the RPC which caused the error. Upon receipt of a report of an error, administration 210 signals table placeholder manager 236 and secondary RPC builder 234 to halt operation, and signals RPC queue 235 with the tag. RPC queue 235 deletes the RPCs corresponding to that tag that remain in the queue, if any. Administration 210 next signals the other unit, the application if the server 240 is the detecting unit, or the server 240 if the application is the detecting unit, via outputs 214, 216, respectively.

If administration 210 signals the server 240, administration 210 includes a tag of the RPCs to be aborted. The server 240 will abort processing RPCs that have the received tag. If administration 210 signals the application, the application can respond to the error. (In one embodiment, administration 210 does not signal the detecting unit, because the detecting unit is presumed to have realized the error occurred.)

In one embodiment, if the detecting unit is the server 240, the server 240 will abort processing all RPCs corresponding to the tag sent by the server 240. In another embodiment, the server 240 does not abort processing RPCs corresponding to this tag. Instead, administration 210 signals via output 214 the application and includes the tag and an error code when it receives the error report from the server 240. The application may use the error code and the tag to determine whether or not the error is of the type for which the application can recover. In such embodiment, the application signals administration 210 via input 214 if the error is of the type from which the application can recover. Administration 210 signals the server 240 via output 216, and server 240 continues processing any RPCs corresponding to that tag as if no error had occurred. Administration 210 does not remove RPCs corresponding to that tag from the RPC queue 235 if the application indicates the error is of the type from which the application can recover.

In one embodiment, the system 200 described above resides in a client computer, however, the present invention may reside in any computer coupled to the client computer, such as a TP monitor or a monitor described in copending application Ser. No. 08/873,644. In another embodiment, the system 200 described above is a conventional AQ propagator commercially available from Oracle Corporation of Redwood Shores, Calif., that receives commands and sends each command received to one of several servers to which it is coupled.

In one embodiment, the server 240 is a conventional server, such as the Oracle 8 product available from Oracle Corporation of Redwood Shores, Calif., modified as described herein. The server 240 receives RPCs tagged as described above and returns to the application program the result of the RPC with the tag of the RPC. The server 240 can detect an error using conventional error detection capabilities, and sends to the client an error code and the tag of the RPC that generated the error. Additionally, in response to an error, the server 240 suspends processing of RPCs having the same tag as the RPC which generated the error, and removes any such RPCs with that tag from the queue in one embodiment. In another embodiment, the server 240 suspends processing of such RPCs and waits for instructions from the client or other device containing the remainder of the apparatus of the present invention. If such client or other device instructs the server 240 to resume processing, the server continues processing the RPCs for which processing was suspended. If such client or other device instructs the server to abort processing, the server does not process the remaining RPCs tagged with the same tag as the RPC which generated the error, and removes other similarly tagged RPCs from the server queue which contains RPCs to be executed by the server 240. Additionally, the server 240 can respond to an instruction containing a tag instructing the server to abort processing of any RPCs with that tag in the same manner, even if the instruction is not in response to an error message generated by the server.

Figure 3A:
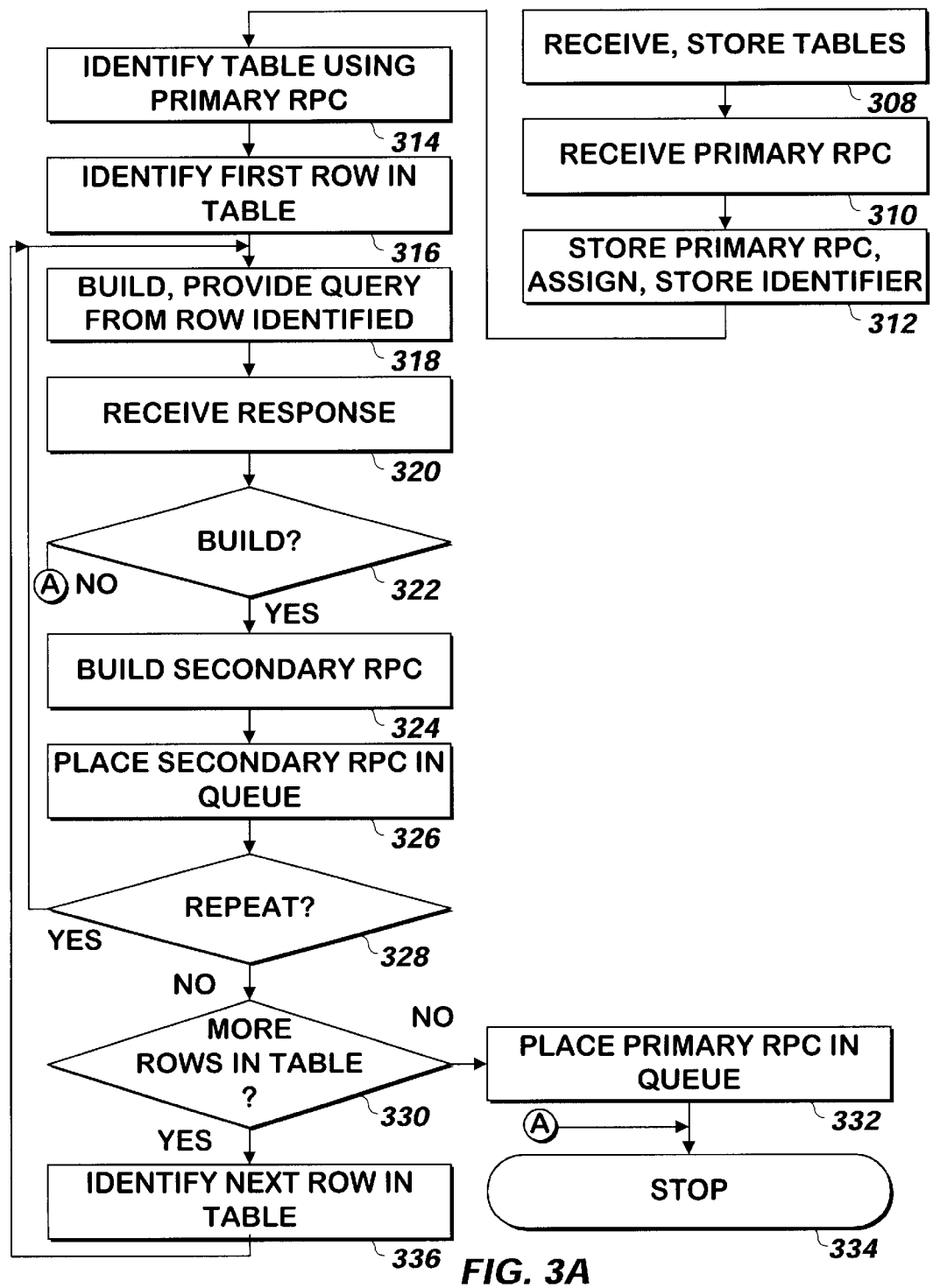
FIG. 3A is a flowchart illustrating a method of providing commands for a server according to one embodiment of the present invention.

Referring now to FIG. 3A, a method of providing at least one command is shown according to one embodiment of the present invention. One or more tables as described above is received and stored 308. A primary RPC is received as described above 310, and the primary RPC may be stored 312. In one embodiment, a unique identifier referred to herein as a "tag" is assigned to the primary RPC and also stored 312. This identifier will identify the primary RPC and all secondary RPCs generated from the primary RPC as described herein.

As described above, each table may contain a set of one or more primary RPCs to which the table corresponds. In such embodiment, the primary RPC received at step 310 is compared with the primary RPCs associated with each table. If a match is located, the table is identified 314. In one embodiment, if no table is identified, the remaining steps in FIG. 3A are not taken. In another embodiment, a default table may be received as a part of step 308, so that if no match is found on the primary RPCs, the default table is identified in step 314.

If a table is identified in step 314, the method continues at step 316. In an alternate embodiment of the present invention, only one table is received at step 308. All primary RPCs utilize this table, and therefore step 314 may be omitted.

The first row in the table identified in step 314 is identified 316. In one embodiment, the first row in a table is stored as the first physical row of the table, however the first row may be stored elsewhere in the table. The query for the row identified is built 318. In one embodiment, building the query is performed by copying the query from a portion of the row identified. The query built is provided 318, for example to an application program.

A response to the query is received 320, for example from an application program. If the response indicates that a secondary RPC is to be built 322, the secondary RPC is built 324. In one embodiment, the secondary RPC is built by extracting in the current row the secondary RPC code in the currently specified table row, appending the parameters received in the response in step 320 and appending the tag assigned and stored in step 312. If the response received in step 320 indicates that no secondary RPC is to be built 322, the method terminates at step 334. Otherwise, the secondary RPC built in step 322 is placed in a queue 326, or otherwise provided.

In one embodiment, the response received in step 320 may contain an optional repeat parameter. In such embodiment, if this repeat parameter is returned true 328, the method continues at step 318, repeating the steps 318 through 326, with the possibility that a different set of parameters is received in the response at step 320 and used to build the secondary RPC at step 324. The Goto parameter described above may also be implemented. If no repeat parameter is returned or it is returned false, the method continues at step 330. In any embodiment in which no repeat parameter is allowed, step 328 may be omitted, and step 330 unconditionally follows step 326.

If there are more rows in the table 330 following the table row identified previously, the next row in the table is identified 336, and the method continues at step 318. In one embodiment, the next row in the table is the row in the table physically following the row in the table identified prior to step 336. If no more rows exist in the table 330, the primary RPC is placed in the queue 332 or otherwise provided, and the method terminates at step 334. In one embodiment, the primary RPC is placed in the queue ahead of the secondary RPCs. In such embodiment, step 332 is performed prior to step 318.

At any step shown in FIG. 3A, an error message may be received. In one embodiment, an error message may be received from the server or from an application program. In one embodiment, an error message includes the tag identifier assigned to the primary RPC in step 312 and associated with the secondary RPCs in step 324. For example, because each RPC sent to the server contains the tag, as described below, the server can return an error message with the tag of the RPC that caused the error. Because the server provides responses to RPCs that complete without errors and the responses include the tag of the RPC, the application program can determine the tag of the RPC that used the error it detects in the result.

Figure 3B:
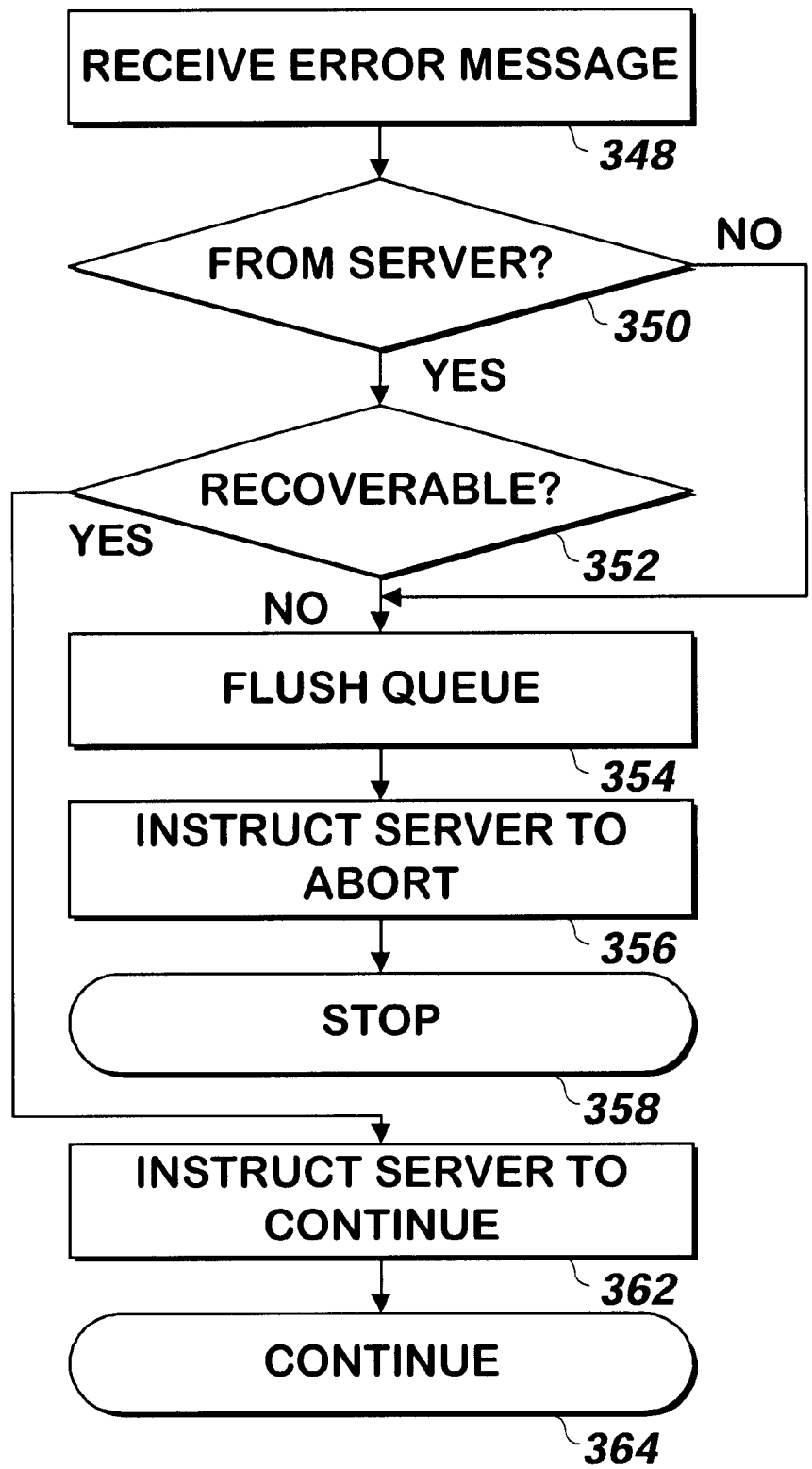
FIG. 3B is a flowchart illustrating a method of responding to an error according to one embodiment of the present invention.

Referring now to FIG. 3B, if an error message is received 348, and the error message is from the server 350, a determination is made 352 whether the error is an error that may be ignored. Such an error is referred to as a recoverable error. In one embodiment, the determination of whether an error is recoverable is made by passing the error message to an application program, and receiving a response indicating whether the error is recoverable. Whether an error is recoverable can depend on the status of the application program. If the error is recoverable, the server is instructed to continue 362 and the method shown in FIG. 3B continues at step 364 as if no error message had been received. If the error message used not recoverable 352, or was not received from the server, RPCs queued for the server with the identifier of the tag received in the error message are removed from the queue 354 and the server is instructed to abort processing 356. In one embodiment, such instruction includes the tag identifier that was stored at step 312 of FIG. 3A. This identifier allows the server to distinguish the RPCs to abort from other RPCs that may have been sent and are waiting to be executed.

In another embodiment, the each RPC may be identified to the server as one from which the server is to report, but not abort processing if the error is not serious (for example, a divide by zero error may be considered serious, but an empty table result may not be serious). The server may report the error by including the tag or another identifier of the remote procedure call such as a number indicating the order in which the RPC was received within the group of similarly tagged RPCs.

Figure 4A:
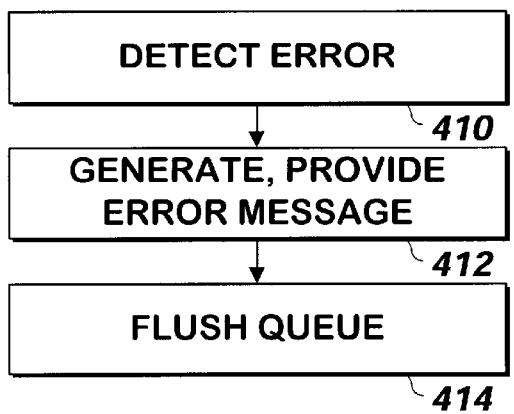
FIG. 4A is a flowchart illustrating a method of responding to an error according to one embodiment of the present invention.

Referring now to FIG. 4A, a method of responding to an error is shown according to one embodiment of the present invention. This method may be used by a server to respond to errors. As a result of executing a command such as an RPC which may include a tag, an error is detected 410 using conventional error detection methods, such as divide by zero and overflow detection. An error message is generated and provided 412 that contains an error code indicating the type of error and the tag of the command that caused the error. In one embodiment, a queue containing pending commands is flushed 414 of any commands having a tag equivalent to the tag of the command that caused the error.

Figure 4B:
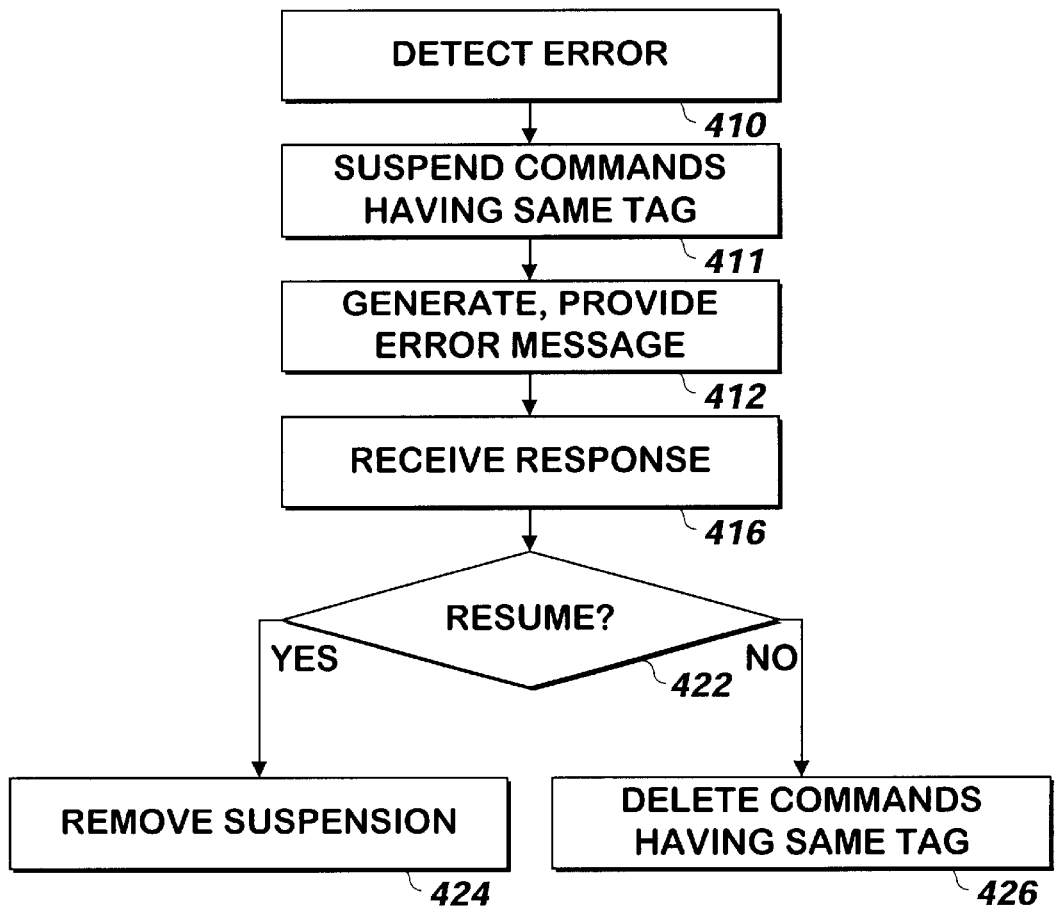
FIG. 4B is a flowchart illustrating a method of responding to an error according to an alternate embodiment of the present invention.

In another embodiment shown in FIG. 4B, between steps 410 and 412 described above, the tag is added 411 to a list of suspended tags used to determine the next command in the queue to execute, with commands having a tag in the suspended list not being executed. A response to the error message provided in step 412 is received 416. If the response is received indicating that execution of such tagged commands should resume 422, the tag is removed 424 from the suspended list and execution of the commands so tagged resumes. If a response is received that indicates execution of such tagged commands should not resume 422, such commands are deleted 426.

Figure 4C:
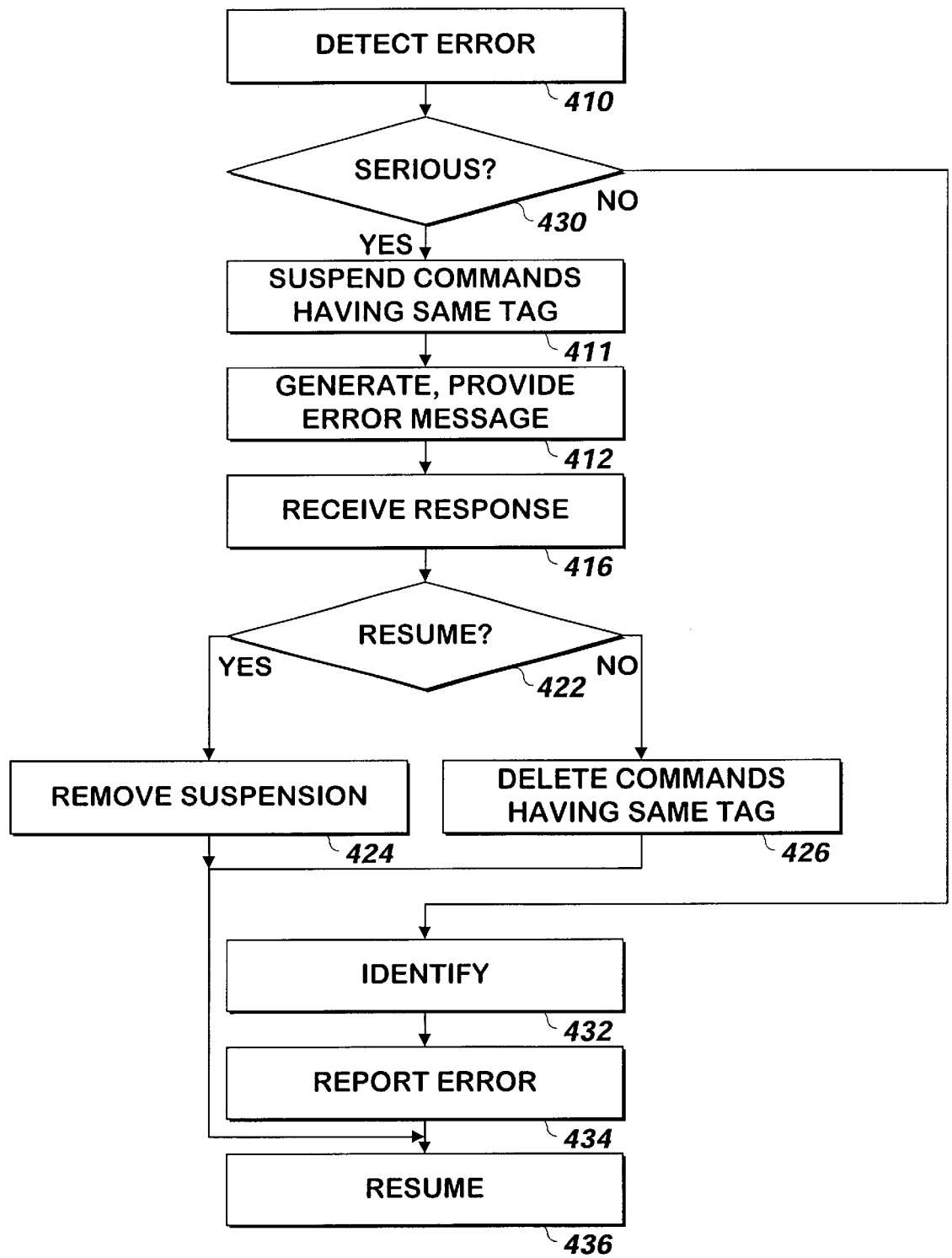
FIG. 4C is a flowchart illustrating a method of responding to an error according to an alternate embodiment of the present invention.

In another embodiment illustrated in FIG. 4C, the above procedure described with reference to FIG. 4B is followed only if the error is serious 430. If not, the command that caused the error is identified 432, an identifier of the command is provided 434 either individually or with identifiers of other commands that caused errors, and processing of other commands continues 436. As shown in the figure, processing also continues after steps 426 and 424.

What is claimed is:

1. An apparatus for providing at an output a first set of commands to be sent to a server, comprising:

an administration having a first input operatively coupled to receive from an application program at least one command, and a second input operatively coupled to receive error messages, the administration for providing at a first output an indicator of receipt of the at least one command;

a query manager having an input coupled to the administration first output, the query manager for, responsive to receipt of the indicator of receipt, providing at an output coupled to the application program at least one query, each of said at least one query corresponding to at least one command in a second set;

an RPC builder having an input operatively coupled to receive from the application program at least one response corresponding to at least one of the at least one query, and for providing at an output coupled to the apparatus output coupled to the server at least one of the commands in the second set, responsive to at least one of the at least one response received at the RPC builder input;

and a server having an input coupled to the RPC builder output for receiving the commands in the second set the server for providing at an output coupled to the administration second input an error code and a tag of the said command, responsive to the execution of a command resulting in an error detectable by the server.

2. The apparatus of claim 1, wherein the administration additionally has a second output for providing an instruction to abort processing, and the server is additionally for receiving at a second input coupled to the administration second output said instruction and for aborting processing of at least one of the commands in the second set corresponding to the tag provided at the server output.

3. A method of providing at least one command, comprising:
   receiving a first command from an application program;
   providing the first command received;
   responsive to the receipt of the first command, locating query information from a set of query information;
   providing to the application program a query, responsive to the query information located;
   receiving from the application program a response corresponding to the query provided;
   building at least one second command, responsive to the response received; and
   providing to a server the at least one second command built; and wherein
      at least one of the second commands comprises a remote procedure code capable of causing a server to execute a plurality of third commands; and
      each of the first and second commands are provided to a queue; and the method additionally comprises:
         receiving an error message; and
            discarding at least one command in the queue responsive to the error message.

4. The method of claim 3 comprising the additional step of, responsive to the error message received, providing a command to a server to abort processing of at least one second command.

5. A method of responding to an error caused by a command having a tag, comprising:
   detecting the error;
   generating an error message comprising the tag;
   providing the error message generated; and
   removing from a queue at least one different command having a tag corresponding to the tag of the command.

6. A method of responding to an error caused by a command having a tag, the method comprising:
   detecting the error;
   indicating suspension of execution of other commands having a tag equivalent to the tag of the command;
   generating an error message comprising the tag;
   providing the error message generated;
   receiving a response having a first state and a second state;
   responsive to the response in the first state, removing the suspension indicated; and
   responsive to the response in the second state, deleting at least one of the other commands.

7. A computer program product comprising a computer useable medium having computer readable program code embodied therein for providing at least one command, the computer program product comprising:
   computer readable program code devices configured to cause a computer to receive a first command from an application program;
   computer readable program code devices configured to cause a computer to provide the first command received;
   computer readable program code devices configured to cause a computer to, responsive to the receipt of the first command, locate query information from a set of query information;
   computer readable program code devices configured to cause a computer to provide to the application program a query, responsive to the query information located;
   computer readable program code devices configured to cause a computer to receive from the application program a response corresponding to the query provided;
   computer readable program code devices configured to cause a computer to build at least one second command, responsive to the response received;
   computer readable program code devices configured to cause a computer to provide to a server the at least one second command built; and wherein
   at least one of the second commands comprises a remote procedure code capable of causing a server to execute a plurality of third commands; and
   each of the first and second commands are provided to a queue; and the computer program product additionally comprises:
      computer readable program code devices configured to cause a computer to receive an error message; and
      computer readable program code devices configured to cause a computer to discard at least one command in the queue responsive to the error message.

8. The computer program product of claim 7 additionally comprising computer readable program code devices configured to cause a computer to, responsive to the error message received, provide a command to a server to abort processing of at least one second command.

9. A computer program product comprising a computer useable medium having computer readable program code embodied therein for responding to an error caused by a command having a tag, the computer program product comprising:
   computer readable program code devices configured to cause a computer to detect the error;
   computer readable program code devices configured to cause a computer to generate an error message comprising the tag;
   computer readable program code devices configured to cause a computer to provide the error message generated; and
   computer readable program code devices configured to cause a computer to remove from a queue at least one different command having a tag corresponding to the tag of the command.

10. A computer program product comprising a computer useable medium having computer readable program code embodied therein for responding to an error caused by a command having a tag, the computer program product comprising:
   computer readable program code devices configured to cause a computer to detect the error;
   computer readable program code devices configured to cause a computer to indicate suspension of execution of other commands having a tag equivalent to the tag of the command;
   computer readable program code devices configured to cause a computer to generate an error message comprising the tag;
   computer readable program code.devices configured to cause a computer to provide the error message generated;
   computer readable program code devices configured to cause a computer to receive a response having a first state and a second state;
   computer readable program code devices configured to cause a computer to responsive to the response in the first state, remove the suspension indicated; and
   computer readable program code devices configured to cause a computer to, responsive to the response in the second state, delete at least one of the other commands.

* * * * *